UNITED STATES PATENT OFFICE.

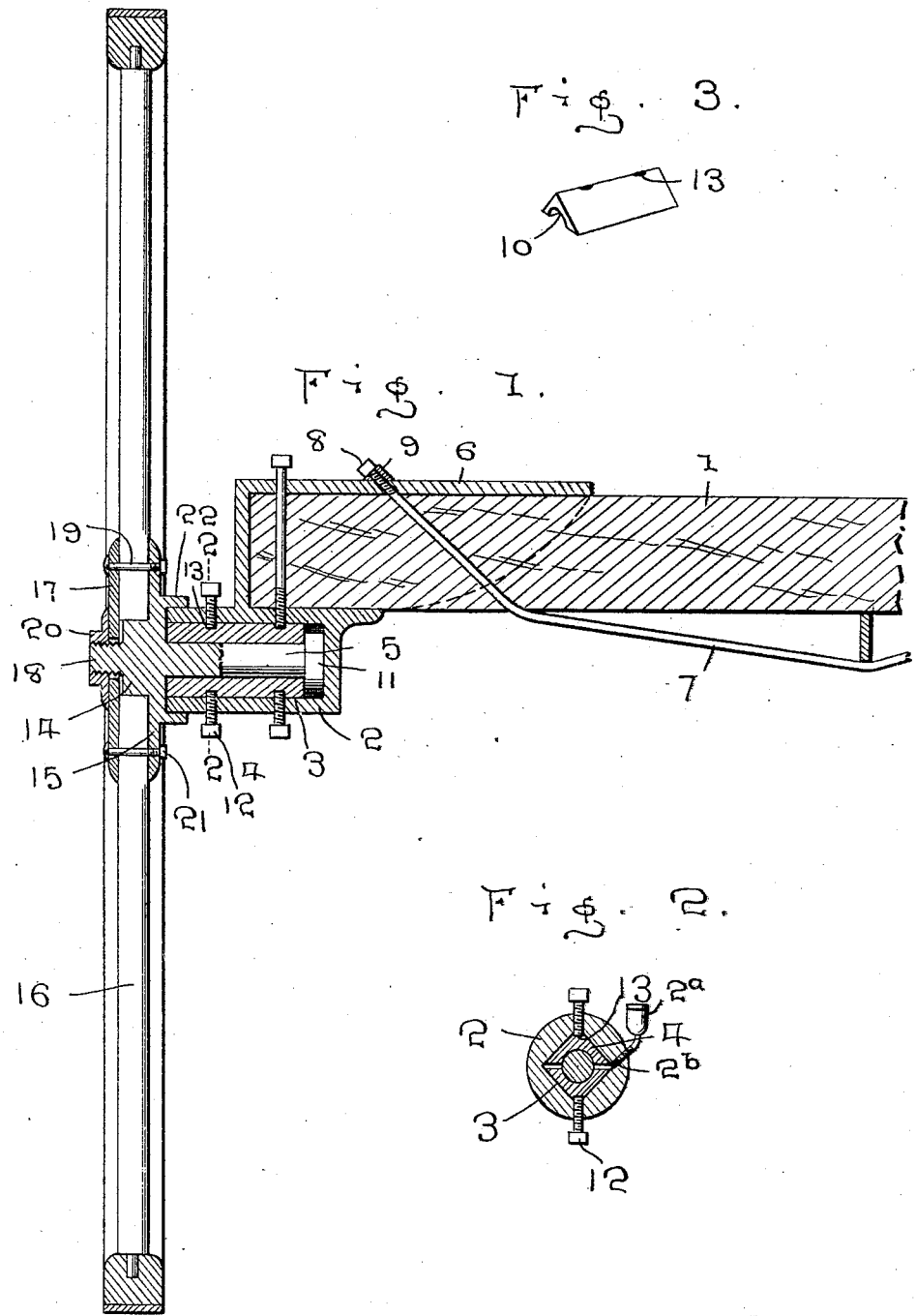

THOMAS A. BARNETT, OF MANIFEST, LOUISIANA.

COMBINED WHEEL HUB AND SPINDLE.

944,936.  Specification of Letters Patent.  Patented Dec. 28, 1909.

Application filed November 25, 1908. Serial No. 464,362.

*To all whom it may concern:*

Be it known that I, THOMAS A. BARNETT, a citizen of the United States, residing at Manifest P. O., Catahoula parish, in the State of Louisiana, have invented certain new and useful Improvements in Combined Wheel Hubs and Spindles; and I do hereby declare the following to be a full, clear, and exact description of the invention, such as will enable others skilled in the art to which it appertains to make and use the same.

My invention relates to new and useful improvements in combined wheel hubs and spindles and my object is to provide means for removably securing spokes to the hub.

A further object is to provide a fixed spindle for the hub.

A still further object is to provide suitable boxing for the spindle and means to adjust the same on the spindle and a still further object is to provide a housing for the boxing and spindle and means for securing the same to the axle of the vehicle.

Other objects and advantages will be hereinafter referred to and more particularly pointed out in the claim.

In the accompanying drawings which are made a part of this application, Figure 1 is a longitudinal central sectional view through a wheel and parts to which the same is attached. Fig. 2 is a transverse sectional view as seen on line 2—2, Fig. 1, and, Fig. 3 is a perspective view of one section of the boxing removed from its housing.

Referring to the drawings, in which similar reference numerals designate corresponding parts throughout the several views, 1 indicates an axle, which may be constructed in the usual or any preferred manner and of that class employed for supporting wheeled vehicles.

Secured to each end of the axle 1, is a housing 2, which is preferably circular in cross section and provided with an oblong opening 3, which opening is preferably square in cross section and is adapted to receive the boxing 4 for the spindle 5. The housing 2 is provided with a socket 6, into which the end of the axle 1 is introduced, the socket being held in position on the end of the axle by introducing a truss rod 7 through the axle and one wall of the socket, that portion of the rod extending through the axle and housing, being disposed at an angle to the longitudinal trend of the axle and has a nut 8 at its outer end, a washer 9 being introduced between the nut and wall of the socket to provide a firm base for the nut.

The boxing 4 is formed in two sections, which sections are triangular in cross section and are provided on their meeting faces with channels 10 to receive the spindle 5, the apexes of said sections being diametrically above and below the spindle, respectively, and in order to compensate for the wear of the spindle and boxing, the sections of the boxings are formed slightly smaller than the opening 3 of the housing, whereby the meeting faces of the section will be slightly spaced apart. A suitable oil or lubricant cup 2ª, having a delivery tube screwed at its lower end into the housing 2 and into communication with a passage 2ᵇ, provided laterally in the housing 2, is employed for supplying oil or other lubricant to the spindle 5. The boxing is of less length than the spindle 5, thereby leaving a space in the housing between the inner end of the boxing and the end wall of the housing to receive a head 11 on the spindle 5 and by anchoring the sections of the boxing within the housing, the spindle will be held against longitudinal movement, this result being accomplished by introducing bolts 12 through the wall of the housing and into engagement with seats 13 in the apex of the sections of the boxings 4, the openings in the housing through which the bolts 12 extend, being threaded, thereby providing means for retaining the sections of the boxing in juxtaposition to the surface of the spindle and compensating for any wear that might occur.

The outer end of the spindle 5 terminates in a hub 14, a circular flange 15 being formed at the intersection of the hub with the spindle to form a stop for one edge of the spokes 16, a circular washer 17 being placed at the opposite edge of the spokes to hold said spokes in position on the hub, the washer 17 being removably secured in position by introducing the same over a screw threaded stem 18 extending outwardly from the hub 14, the opening in the washer being somewhat greater in diameter than the cross-section of said stem.

The inner ends of the spokes 16 rest upon the peripheral face of the hub 14 and are slightly greater in width than the width of the hub, so that the washer 17 will be slightly spaced from the end of the hub and by introducing bolts 19 through the washer 17 and flange 15 and turning a nut 20 on the stem 18, the spokes may be firmly clamped against the flange 15.

In assembling the parts of my improved device, the outer ends of the spokes are engaged with the felly of the wheels and the inner ends thereof disposed around the hub 14 and against the flange 15, when the washer 17 is placed in position over the screw-threaded stem 18 and the nut 20 turned onto the stem. The bolts 19 are then introduced through the openings in the washer and flange and the washer drawn toward the flange by the nuts 21 on the ends of the bolts, there being a bolt between each pair of spokes and after the washer has been drawn inwardly its full distance, the nut 20 is moved firmly into engagement with the outer face of the washer.

By this construction, it will be readily seen that should the spokes contract, the washer 17 may be drawn still closer to the flange and rattling of the spokes prevented or the washer may be entirely removed from position and one or more new spokes placed in position. The sections of the boxing are then placed in position on the spindle 5 one above and the other below the spindle and resting between the flange 15 and the head 11, after which the spindle and boxing are introduced into the opening in the housing 2, foreign particles being prevented from coming in contact with the wearing surface of the spindle by forming a circular band 22 integral with the flange 15 and in position to extend over the open end of the housing 2. The bolts 12 are then turned inwardly until their free ends are entered into the seats 13 in the apexes of the sections of the boxing 4, the pressure of the bolts on the sections being such as to hold the sections into engagement with the spindle, but at the same time leaving the spindle free to rotate within the boxing. As the spindle or boxing becomes worn, the bolts 12 may be operated to move the sections of the boxing in closer relationship with the axle, thereby compensating for the wear and holding the spindle in its proper alinement and it will likewise be seen that the wheel may be quickly released from the axle 1 by turning the bolts out of engagement with their respective seats. It will further be seen that by securing the spokes of the hub in the manner shown, the parts of the wheel may be quickly assembled or separated for introducing one or more new spokes and that should the spokes contract, such contraction may be compensated for by moving the washer in closer proximity to the flange on the hub.

What I claim is:

A device of the character described, comprising a spindle having a head at one end, and a hub at its opposite end, said hub having at its inner edge a disk-like flange, said flange having an annular collar forming an extension upon one side, said hub also having a screw-threaded extension substantially in alinement with said spindle, said hub having a plain external cylindrical surface intermediate of said disk-like flange and the said threaded extension, the outer facing portion of said hub with the cylindrical surface thereof being stepped-like in formation between said flange and said extension, a washer of disk-like formation opposed to said disk-like flange, and having its bore of greater diameter than said threaded extension and adapted to initially stand away from the outer vertical face of said hub, a nut applied to said screw-threaded extension and engaging said disk-like washer, a housing applied to an axle, a boxing receiving said spindle and arranged in said housing, and means for the retention of said boxing with said spindle within said housing.

In testimony whereof I have signed my name to this specification in the presence of two subscribing witnesses.

THOMAS A. BARNETT.

Witnesses:
  J. E. WOMACK,
  C. R. WEBB.